Aug. 30, 1966     R. M. CENTNER     3,270,186
CUTTER RADIUS OFFSET SYSTEM FOR NUMERICALLY CONTROLLED MACHINES
Filed Aug. 20, 1962     4 Sheets-Sheet 2

INVENTOR.
RONALD M. CENTNER.
BY
ATTORNEY

INVENTOR.
RONALD M. CENTNER
BY
ATTORNEY

United States Patent Office 3,270,186
Patented August 30, 1966

3,270,186
CUTTER RADIUS OFFSET SYSTEM FOR NUMERICALLY CONTROLLED MACHINES
Ronald M. Centner, Royal Oak, Mich., assignor to The Bendix Corporation, Detroit, Mich., a corporation of Delaware
Filed Aug. 20, 1962, Ser. No. 217,880
8 Claims. (Cl. 235—151.11)

This invention relates to machine tools and the like which are automatically controlled from a numerical record and more particularly to a system for accommodating the operation of such machines to the use of cutters of various sizes.

Electronic systems for controlling milling machines in accordance with a numeral record, which often takes the form of a punched tape, have found extensive application in the manufacture of small quantities of identical parts. In general, these machines have employed a numerical record which prescribed a continuous path to be followed by the center of the cutter of a milling machine in order to form a particular part. A particular record could only be used with a cutter of a given diameter and any variations in the size of the cutter from this ideal would produce inaccuracies in the part; an undersize cutter producing an oversize part, and vice versa. Systems have been proposed for modifying the operation of such control systems so that a tape which was programmed for a given cutter size might be used with cutters which varied slightly from that ideal size in such a manner as to still produce a perfect part. In general, such modifying systems have included means for determining the slope of the cutter path at a given instant, and for producing two signals proportional to the sine and cosine of the angle which the perpendicular to the slope makes with the co-ordinate axes. These signals were then multiplied by a radius correcting factor and summed with the voltages which normally controlled the servomechanisms that moved the cutter in a rectangular co-ordinate system. This system acted to offset the center of the cutting tool by an amount equal to the difference between the programmed cutter radius and its actual radius in a direction perpendicular to the slope of the cutting path. The use of such a system is limited to situations in which there is a rather small variation between programmed cutter size and actual cutter size because at points which mark a discontinuity in the slope of the workpiece surface being formed, the simple modification to a tool center program by the addition or subtraction of a radius produces inaccuracies which increase rapidly as the compensation radius increases.

It is the object of the present invention to provide a numerical control system for milling machines and the like utilizing a program which outlines the workpiece contour as it might be formed with a zero diameter cutter, rather than prescribing the path of the center of a cutter having a finite diameter. Means are provided to vary the effect of this program on the machine in accordance with the size of any cutter which is actually being used with the machine. Therefore, a given program may be utilized with any size cutter which is suitable for actually forming the workpiece. Both variations in basic cutter size and cutters which vary only slightly from the nominal dimensions may be accommodated by this system. Use of this system will permit the machining of mating parts with a single take, by simply changing the sign of the offset vector.

The system employed to achieve this object operates in a manner that differs slightly from systems wherein the center of a cutter path is broken. In such systems, a convex discontinuity in slope is traversed by carrying the cutter center beyond the limit imposed by the perpendicular to the termination of the first side of the cut so as to bring the cutter edge out of contact with the workpiece. The cutter center proceeds until it intersects its path parallel to the second side of the cut and then the center changes direction and moves along the second path until the cutter edge is again brought into contact with the workpiece. This method is that normally employed by an operator on manually controlling a machine. The present invention traverses a convex change in slope by bringing the cutter center up to the perpendicular which marks the termination of the first cut; then causes the center of the tool to be rotated along a path having as its center the corner of the workpiece itself until the cutter center reaches a position wherein it is on a line perpendicular to the slope of the second cut taken through the corner of the workpiece. At that point, it is in position to begin the second cut. The information for implementing this technique can be expressed in terms of the workpiece co-ordinates and the offset radius which form the input to this system.

In a preferred embodiment, which will subsequently be described in detail, the invention is applied to a digital numerical control system of the type specifically described in U.S. patent application Serial No. 74,687, filed December 8, 1960. Such a system is capable of two basic modes of operation: a linear mode wherein the cutter path is a straight line; and a circular mode wherein the cutter path follows a circle about a prescribed center. The preferred embodiment describes the application of the invention to the linear mode wherein a plurality of "command numbers" representing the end points of a particular linear motion are introduced into the controller portion of the circuitry which then generates a plurality of pulse trains having frequencies which are in the same ratio as the command numbers and each containing a number of pulses which is proportional to its command number. These pulse trains are applied to servomechanisms which move the workpiece along orthogonal axes. In accordance with the present invention, the command numbers relate to the end points of a linear section of the workpiece rather than the end points of the cutter center motion as is required by the prior art. These pulse trains are introduced to servomechanisms which generate analog signals proportional to the differences between the motions commanded by the pulse trains and the actual motion of the machine. In the present invention, the analog signals which control the two servomechanisms which move the cutter along paths perpendicular to the cutter axes are modified by a pair of offset signals prepared by an additional system. This system accepts the two command numbers which contain the information relating to the motion of the cutter along the two axes perpendicular to its center and converts them into analog voltages. These analog voltages are used to amplitude modulate two square waves 90 degrees out of phase to generate two sine waves which are vectorially added to produce a third sine wave having a phase shift proportional to the resultant of the two sine waves. This resultant sine wave is then shaped into a square wave. The command numbers which are used to generate this square wave are obtained from the temporary storage section of the controller so that the phase of the square wave represents the slope of the next cut to be made by the control system. When the previous cut is completed by the control system, the square wave is used to adjust the output signal of a variable phase square wave "command counter" to a value representing the slope of the next cut. The output of the command counter is then used as a keying signal for two demodulators which receive two reference sine waves which are in phase with the original square waves. The output of these demodulators represent voltages related to one another by the sine and the cosine of the angle that is the sum of the two motion components. These voltages are imposed across potentiometers on which the machine operator sets the radius of the cutter being used so as to multiply this factor by the sine and cosine of the normal angle. These voltages are used to modify the signals developed by the servo system so as to displace the output path by a distance equal to the radius of the cutter.

When the cutter has reached the end of one programmed path and the output of the command counter is adjusted to the slope of the next programmed path, the servomechanisms do not receive any signals from the controller but only receive the two compensation voltages which both change while the cutter command counter signal is being generated. The change in these two signals causes the otherwise stationary cutter to rotate about its point of contact with the workpiece until its center intersects the perpendicular to the new cutter path. The cutter may then proceed along the new cutter path under the control of the pulse trains developed by the command numbers as well as the offset signal developed by the inventive apparatus. While the cutter is moving on this new path, the novel equipment is accepting the command numbers relating to the next linear path so as to develop a square wave having a phase proportional to the slope of that path. This square wave is used to re-set the command counter when the end of path is reached. If two paths having the same slope join one another, the equipment will not make any adjustment in the command counter.

Means are also provided for setting the command counter to a proper phase previous to the initial cut to be made by the system.

Other objects, advantages, and application of the present invention will be made apparent by the following detailed description of a preferred embodiment of the invention. The description makes reference to the accompanying drawings in which.

While the invention is illustrated in connection with a digital control system of the type specifically described in U.S. patent application No. 74,687, filed December 8, 1960, it is equally applicable to other numerical control systems of that general class, such as that described in U.S. Patent No. 3,002,115. Accordingly, the non-inventive, but co-operative, elements of the system will be described in a functional manner. Reference may be had to other sources, such as those noted above, for specific details of systems, operation, or construction.

Figure 1:
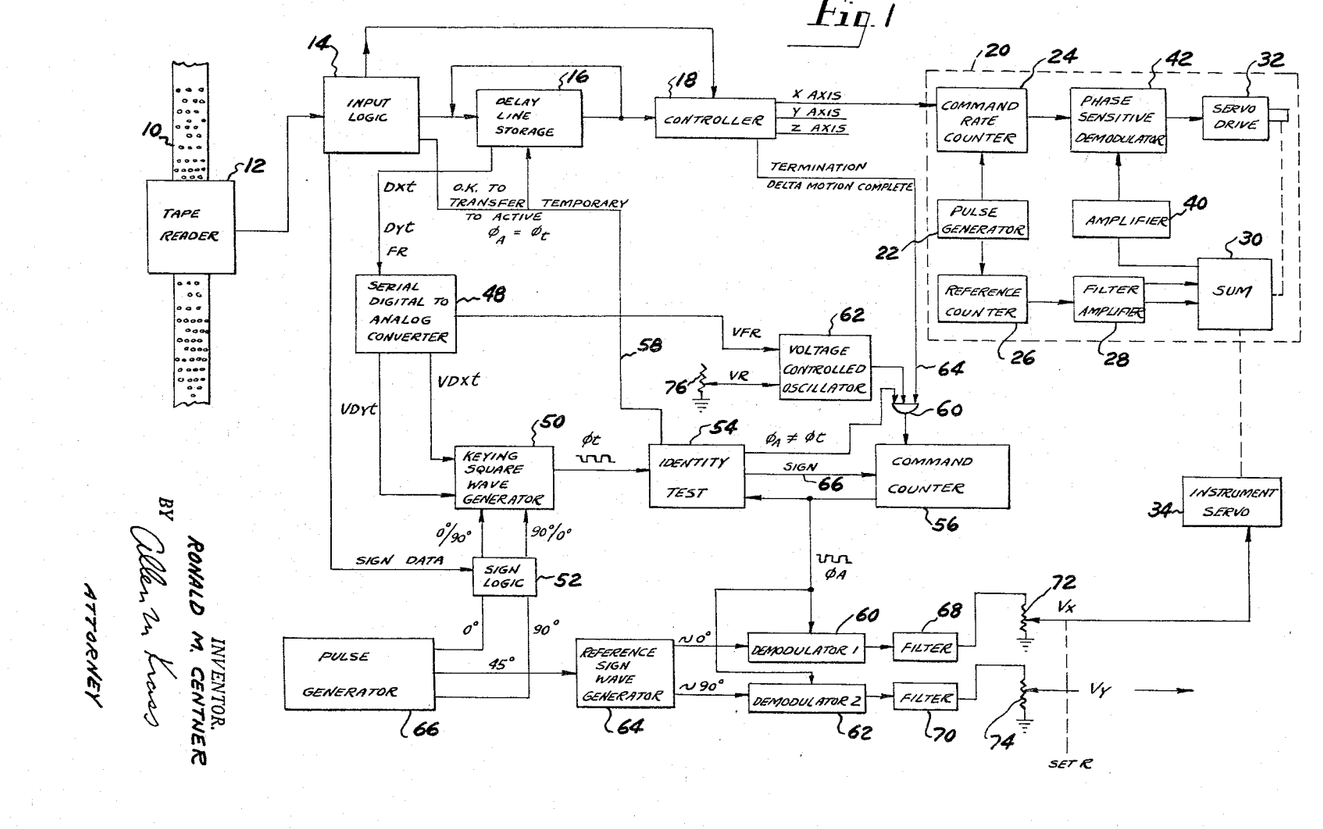
FIGURE 1 is a schematic illustration in block form of an entire digital numerical control system placing special emphasis upon those sections which embody the inventive concept.

The information for the control of this system is normally contained on a punched tape 10. A tape reader 12 converts the information into electrical form and feeds it to an input logic section 14.

The information on the tape may be conveniently divided into groups, termed "blocks," each of which contains the part data necessary for the machine to complete one linear or circular motion increment. For a linear cut, the block information contains code signals relating to the total length of the X component of the cut, Y component of the cut, and Z component of the cut, and their signs; the fact that the block is linear; and, an end of block signal. For use with the present invention, the tape must contain a code indicating whether the machined surface is to the left or right of the advancing cutter. While the embodiment of the invention disclosed in FIGURES 1–6 is limited to linear interpolation for a circular cut, the length and signs of the X, Y, and Z motions are replaced by codes for the co-ordinates of the beginning and end points of a circle to be cut in two co-ordinates. In the subsequent discussion, it will be assumed that the machine being controlled employs a circular cutter which revolves about an axis perpendicular to the X and Y controlled axes.

The input logic unit 14 receives the information from the tape and presents it is a delay line storage unit 16, and a controller 18 upon the occurrence of predetermined conditions. The delay line storage unit and the controller 18 operate to convert the tape information into three trains of pulses, which are then transmitted to the X axis servo-system 20 and similiar systems for the Y axis and the Z axis, which are not shown. The servo-system 20 operates in a manner more particularly described in U.S. Patent 3,011,110, issued November 28, 1961, to convert the train of pulses which it receives from the controller into an output motion. The total length of the output motion is directly proportional to the number of pulses in the train, and the rate of output motion is proportional to the rate of pulse reception from the controller 18.

The servo drive includes a pulse generator 22 that provides uniform trains of pulses to a command counter 24, which also has as an input the pulse train from the controller 18, and to a reference counter 26. The reference counter provides an output square wave which shifts sign upon the receipt of a particular number of pulses from the generator 22. This square waves is transmitted to a filter and amplifier 28, that converts the square wave into a pair of sine waves 90 degrees apart in time phase. The two sine waves are fed to a summing unit 30, which also receives as inputs the mechanical rotation of a servo drive unit 32 and an instrument servo 34. The servo drive unit 32 is within the X axis servo-system 20 and has its output shaft drivingly connected to the machine being controlled. The mechanical connection with the servo drive unit 32 provides the summing unit 30 with an actual indication of the position of the output member. The mechanical connection with the instrument servo 34 presents the summing unit 30 with an indication which is a function of the offset path; that is, the difference between a part contour as coded on the tape and the desired path of the center of the cutter being used with this system.

The summing unit 30 includes a pair of resolvers, to be subsequently described, which act to either add or subtract the offset signal from the instrument servo 34 to the signal developed by the input from the servo drive. 32. The output of the summing unit represents a sine wave having a phase shift which is proportional to the position of the machine element as controlled by the servo drive 32 plus or minus an angle which is a function of the offset factor, depending upon the sign of that factor. The exact nature of the summing unit 30 and alternate methods of introducing the offset signal into the servo drive will be noted subsequently.

The summing unit 30 provides this output to an amplifier 40, which in turn feeds a phase sensitive demodulator 42. The demodulator 42 has as its keying input a square wave from the command counter 24. This command counter converts the pulses from the generator 22 into a square wave in the same manner as the reference counter 26, but adds or subtracts the signals from the controller 18 from the pulse generator train, depending upon the sign of the X motion, as contained on the tape.

Thus, the square wave to the demodulator 42 from the command counter 24 is advanced or retarded in its phase with respect to the square wave from the counter 26, as a function of the pulses received from the controller 18.

The demodulator 42 provides an output D.C. signal which is a function of the phase difference between the command counter keying square wave and the signal received from the summing unit 30. This output is fed directly to the servo drive 32 causing it to change its output to the summing unit 30 in such a manner as to bring the phase of the signal from the amplifier 40 into agreement with the command signal from the counter 24. In this manner, the output shaft is rotated in accordance with the algebraic sum of the X command signal from the controller 18 and the offset signal from the servo 34.

With the exception of the summing unit 30 and the servo 34, the system which has heretofore been described is known in the prior art, and its elements are only novel as they appear in combination with the entire inventive concept. The novel aspects of the control circuit will be described hereinafter.

The delay line storage unit 16 feeds serial digital signals, termed $D_{xt}$, $D_{yt}$, and FR to a serial digital to analog converter 48. The $D_{xt}$ and $D_{yt}$ signals represent the lengths of the X and Y components of linear cut. The subsequent circuitry calculates the resultant motion angle in the X and Y plane from these quantities and generates the sine and the cosine of the slope angle of the art.

The signals $D_{xt}$ and $D_{yt}$ represent the temporary information which has just been removed from the tape and will be fed to the controller 18 for use with the machine at such time as the previous cut is completed. That is, while the delay line storage unit is feeding signals $D_{xt}$ and $D_{yt}$ to the serial digital to analog converter 48, the controller 18 is operating the machine under the influence of a previous set of data which will be termed $D_{xa}$, $D_{ya}$, and $D_{za}$.

The serial digital to analog converter operates to establish analog representations of the two motion components. These representations are static in the sense that both occur simultaneously, although in case of circular interpolation (as in the embodiment of FIGURE 7) they vary from instant to instant and during both circular and linear interpolation they change as a new block is operated upon by the control system.

The two static representations, which will be termed $VD_{xt}$ and $VD_{yt}$ are provided to a keying square wave generator 50. This unit also has two inputs from a sign logic unit 52, which constitute two square waves 90 degrees out of phase with respect to one another. The keying square wave generator 50 utilizes these signals to provide a square wave output which is shifted with respect to its input square waves by the resultant cutting angle. The operation of the square wave generator 50 will be described in more detail subsequently.

The square wave output of the generator 50 is provided to an identity test unit 54. The identity test unit also receives the square wave output of a command counter 56 and acts to compare the phase of the two. When the two signals are in phase, it provides output along line 58 to the input logic unit. When the two are different, it provides input to an AND gate 60 which controls the application of pulses to the command counter 56 by a voltage control oscillator 62. The gate 60 also has input from a line 64 from the controller 18 which signals the termination of the cut under the control of the active information. When this signal is received on line 64 and the phases of the keying square wave of generator 50 and command counter 56 are out of phase with one another, pulses are provided from the voltage controlled oscillator 62 through the gate 60 to shift the phase output of the command counter in such a direction as to bring its phase into identity with the output of the keying square wave generator 50. The direction of the pulse introduction into the command counter 56 is controlled by a signal on line 67 from the identity test unit 54. This signal indicates the sign of the algebraic difference between the phases of the units 50 and 56. The command counter 56 is of an identical construction to the command counter 24.

The command counter 56 also provides output to two additional phase sensitive demodulators 60 and 61. The demodulator 60 has input from one output of a reference sine wave generator 64 which provides a sine wave having a phase displacement of zero degrees with respect to one of the two square waves which were provided to the keying square wave generator 50. The other demodulator 61 has as its input a sine wave which is shifted by 90 degrees wth respect to the sine wave applied to demodulator 60.

Both the sign logic unit 52 and the reference sine wave generator 64 receive their signals from a pulse generator 66. The generator 66 provides two outputs to the sign logic unit which are displaced by 90 degrees and a third output to the sine wave generator 64 which is displaced by 45 degrees with respect to the other two square waves. The sine wave generator 64 converts its input square wave to a sine wave and then develops two sine waves displaced 45 degrees in each direction from the first for transmission to the demodulators 60 and 61.

The demodulators 60 and 61 each provide, as their outputs, D.C. signals proportional to the phase angle between their inputs from the sine wave generator and from the command counter 56. In the case of the demodulator 60, this signal is proportional to the sine of the resultant cutting angle, while the demodulator 60 provides an output signal proportional to the cosine of the cutting angle. These signals are passed through filters 68 and 70 and imposed upon potentiometers 72 and 74, both of which are manually set by the operator to a correction factor R.

The output from the movable contact of potentiometer 72 is converted into a shaft rotation by the instrument servo 34. This shaft rotation provides one of the mechanical inputs to the summing unit 30 as has been previously noted. The output from the movable contact of potentiometer 74 is transmitted to a similar point in the Y servo drive.

The voltage controlled oscillator 62 is a pulse generator of the type which provides an output frequency which is a function of the ratio of two input voltages. One of its inputs is a voltage VR derived from a potentiometer 76 which is ganged to and driven by the potentiometers 72 and 74. This potentiometer provides a voltage output proportional to the offset magnitude. The other input to the oscillator 62 is VFR which is proportional to the feed rate signal and is derived from the serial digital to analog converter 48. The oscillator 62 provides an output square wave having a frequency directly proportional to the feed rate and inversely proportional to the offset magnitude. This frequency controls the rate of phase shift of the command counter 56 when it is being brought into line with a new block of temporary storage information.

In broad summary, the manner of operation of the compensation signal generating sub-system is as follows: The serial digital to analog converter 48 continuously receives signals representative of the X and Y components of cut commanded by the temporarily stored data from the delay line storage unit 16 and presents them in static analog form to the keying square wave generator 50, which also has as inputs two square waves, 90 degrees out of phase with one another, from the pulse generator 66. The sign logic unit 52 has a plurality of inputs from the input logic circuit 14 and uses them to determine the manner of transmission of the two signals to the keying square wave generator. The keying square wave generator provides an output square wave which is shifted with respect to its input square waves by the resultant temporary cutting angle.

The phase of this square wave is continually compared with the phase of a square wave generated by the command counter 56 in the identity test unit 54. When the phases of the two signals are equal, the identity test unit 54 puts out a signal on line 58 indicating that it is permissible to transfer information from the temporary to the active storage units within the controller 18. When the phases of the two signals are not equal, an input is provided to the AND gate 60 which controls the connection between the voltage controlled oscillator 62 and the command counter 56.

When the controller 18 has completely utilized the active block of information so as to reach the termination of one cut, the signal from the controller 18 to the command rate counter 24 is terminated and command counter 56 is shifted by applying signals from the oscillator 62 until its output agrees with the phase of the keying square wave generator 50.

When the two signals become identical, the signal to the gate 60 is terminated and a signal allows the temporary information to be transferred to the controller 18. This process must only be performed for the first block of information carried on the tape and wherever a difference in slope exists between successive cuts commanded by the tape. The first block of information contained on the tape is not admitted to the active storage section of the controller 18 until it has been utilized by the system to correct whatever previous setting was in the command counter. During the transition between subsequent blocks of information, if they command identical slopes, no adjustment of the command counter 56 is necessary and a signal will immediately be present on line 58 allowing the transfer of the temporary information to the active sections.

The square wave output of the command counter 56 keys the two phase sensitive demodulators 60 and 62, which have as their inputs reference sine waves displaced from one another by 90 degrees. The outputs of the demodulators are therefore proportional to the sine and cosine of the resultant cutting angle. Potentiometers 72 and 74 multiply these signals by the correction factor R to provide offset signals for the two servo drives.

During a block of information commanding a linear cut, it should be noted that the output signals $V_x$ and $V_y$ from the potentiometer 72 and 74 are constant except during the shift of the command counter 56 which occurs between two cuts of differing slope. During the time that the command counter is being shifted, the signals $V_x$ and $V_y$ are varying and they are the only signals being presented to their respective servos since the controller 18 has completed one block of information and is awaiting the transfer of another block which can only occur after the shift in the phase of the signal from the command counter 56.

Figure 5:
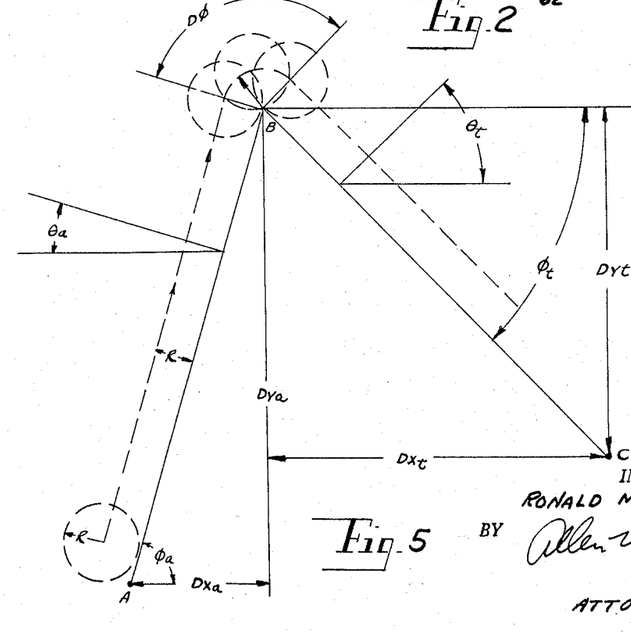
FIGURE 5 is a diagram illustrating the operation of the system.

FIG. 5 graphically illustrates the resulting output motion produced by this system. Two blocks of information commanding linear cuts of different slope form the basis of the situation illustrated. The first cut to be made is between the points A and B and command information contained in the tape includes $D_{xa}$ and $D_{ya}$ which results in a cutting slope of $\theta_a$. The second cut has the co-ordinates $D_{xt}$ and $D_{yt}$ and results in a different cutting slope $\theta_t$. The directions of the offset vectors which must be perpendicular to the cutting slopes, are $\theta_a$ and $\theta_t$, respectively. A cutter of radius R is being utilized. With an offset setting of R and an initial displacement of the phase of the command counter 56 to a setting equal to $\theta_a$, the cutter is moved along its commanded path until its center reaches the line perpendicular to the line AB at point B. By this time the information $D_{xt}$ and $D_{yt}$ is contained in the delay line storage unit 16 and has produced an output of the keying square wave generator 50 which has a phase of $\theta_t$. Since the command counter output has a phase equal to $\theta_a$, no output is provided on the line 58 preventing transfer of the temporary information to the controller 18. However, a signal is provided to the gate 60 which allows the phase of the command counter to begin shifting under influence of the voltage control oscillator 62 as soon as a signal on line 63 indicates that the cutter has reached point B. The command counter output signal is then shifted at a rate directly proportional to VFR and inversely proportional to VR. This causes the voltages $V_x$ and $V_y$ to vary at corresponding rates. The effect of these signals on the servo drive is to cause the cutter center to rotate about a circle R having its center at point B, at a feedrate equal to FR. Therefore, it remains in contact with the work at point B and its center rotates about that point until the phase output of the command counter reaches $\theta_t$. At this point the cutter center is disposed on a line extending from point B perpendicular to the slope of the next cut. A signal on line 58 then causes the temporary information to be transferred to the controller 18 wherein it causes the servos to move the output device so as to perform the cut B–C.

Figures 3, 7:
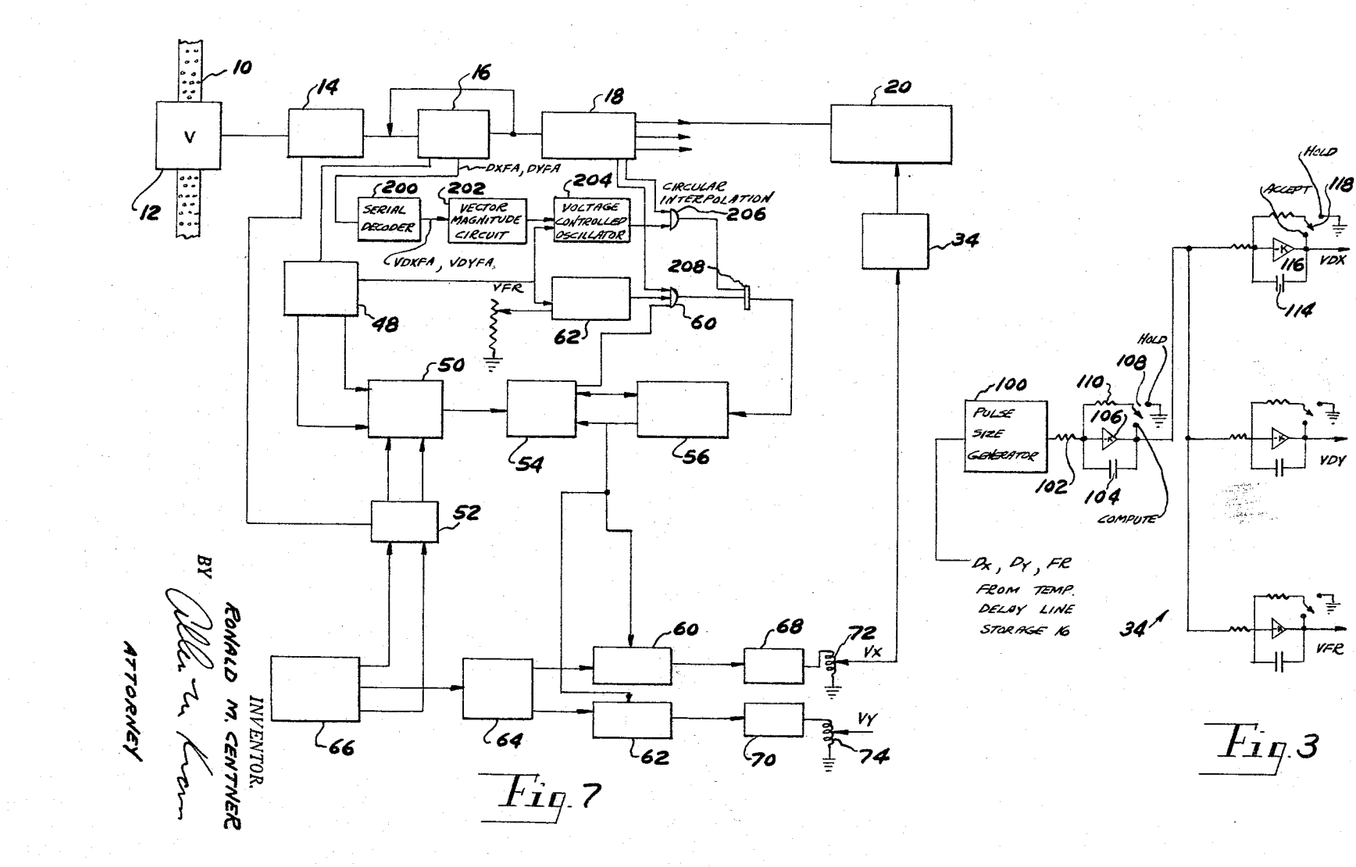
FIGURE 3 is a schematic block diagram of the serial to analog digital converter used with the present invention.
FIGURE 7 is an alternate embodiment of the invention capable of handling circular interpolation as well as linear interpolation.

The circuitry of the more novel aspects of the system of FIG. 1 will now be described in greater detail. The serial digital to analog converter 48 which develops the voltages $VD_{xt}$, and $VD_{yt}$, and VFR is preferably of the "Shannon-Rack" type. FIG. 3 broadly represents the circuitry of the decode and hold unit 48. As has been noted, the unit 48 receives serial digital representations of $D_x$, $D_y$ and FR from the delay line temporary storage unit 16 and creates static analog representations of those voltages. The signals $D_x$, $D_y$, and FR, which occur in serial binary form, are first passed through a pulse size regulator 100, which reshapes them. Assuming that $D_x$ is being transmitted to the pulse size regulator first in serial binary form with its least significant bit leading, it is passed through a resistance 102 and acts to charge a condenser 104. The condenser 104 is shunted by an operational amplifier 106 which assures that the input point to the capacitor 104 remains at virtual ground potential to prevent the charge on 104 from blocking additional charge input. When a transistor switch 108 is in the "compute" position, as it is when $D_x$ is being received, a resistor 110 also shunts the capacitor 104. The time constant of this RC circuit is such that 50% of the charge on the capacitor decays during the time occupied by each bit in the word $D_x$. Therefore, after the receipt of $n$ bits, each represented by a constant-area pulse, the charge on the capacitor 104 will be a scale factor constant multiplied by the series $x_1$ plus $x_2/2$ plus $x_3/4$ plus . . . $x_n/2^{n-1}$, where each $x$ has the value 1 or 0 depending on the presence or absence of a 1 at the corresponding bit position in the binary word. This is equivalent to the analog value of $D_x$.

After all the digits in $D_x$ have been received, the switch 108 is returned to the "hold" position which disconnects resistor 110 and causes the charge on the capacitor 104 to be retained. A transistor switch is then pulsed to the "accept" position. This allows a capacitor 114 to become charged to a value proportional to the charge on capacitor 104. After a sufficient time has elapsed to charge the capacitor 114 to very nearly the voltage of the capacitor 104, switches 112 and 118 are returned to "hold" position. The operational amplifier 116 provides a long time constant, permitting capacitor 114 to retain its charge until the next entry of $D_x$ data. The voltage across the capacitor 114 now constitutes the $VD_{xt}$ which provides one input to the keying square wave generator 50.

Circuits identical to that formed by the components 114, 116, 118 are also connected by switches to the capacitor 104 to accept and hold the voltages $VD_y$ and VFR. If these words follows each other immediately in serial fashion, the capacitor 104 will miss the first few bits of each word while it is transferring the analog value of the previous word to its "hold" circuit. However, if the word has a sufficient number of bits this loss will not be of significance because the least significant bits are processed first.

Figure 2:
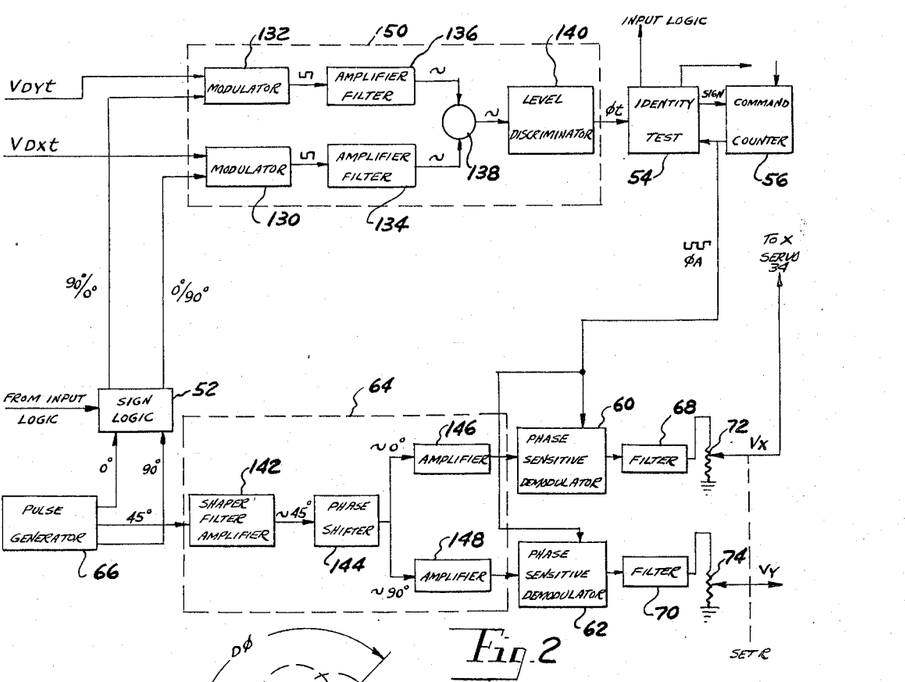
FIGURE 2 is a schematic block diagram disclosing certain inventive sections of the system in greater detail.

As seen in FIG. 2 the keying square wave generator 50 includes a pair of modulators 130 which receives $VD_{xt}$, and 132 which receives $VD_{yt}$. Each of these modulators also receives a square wave from the sign logic unit 52. The square waves are displaced from one another by 90 degrees. Their preparation and transmission to the modulators 130 and 132 will be subsequently described. $VD_{xt}$ and $VD_{yt}$ are used to amplitude modulate the square waves, which are then passed through amplifiers and filters 134 and 136 to form sine waves displaced by 90 degrees from one another and having magnitudes proportional to $VD_{xt}$ and $VD_{yt}$. These sine waves are summed by unit 138 to form a single sine wave which has a phase shift with respect to the square waves from the sign logic unit which is equal the proper direction of the offset vector, perpendicular to the cutting angle which $D_x$ and $D_y$ will produce. This sine wave is provided to a level discriminator 140, which utilizes the zero cross-over point of the sine wave to generate a square wave having an identical phase shift.

As has been noted the pulse generator 66 provides the two square waves displaced by 90 degrees from one another which the sign logic unit transmits to modulators 130 and 132. The sign logic unit 52 acts as a reversing switch and determines which of the two square waves goes to which of the two modulators 130 and 132 on the basis of information received from the input logic unit 14. It may readily be seen that the reversal of the square waves to the two modulators units 130 and 132 will result in a 180 degree shift of the offset signals with respect to the normal cutter path.

Figure 4:
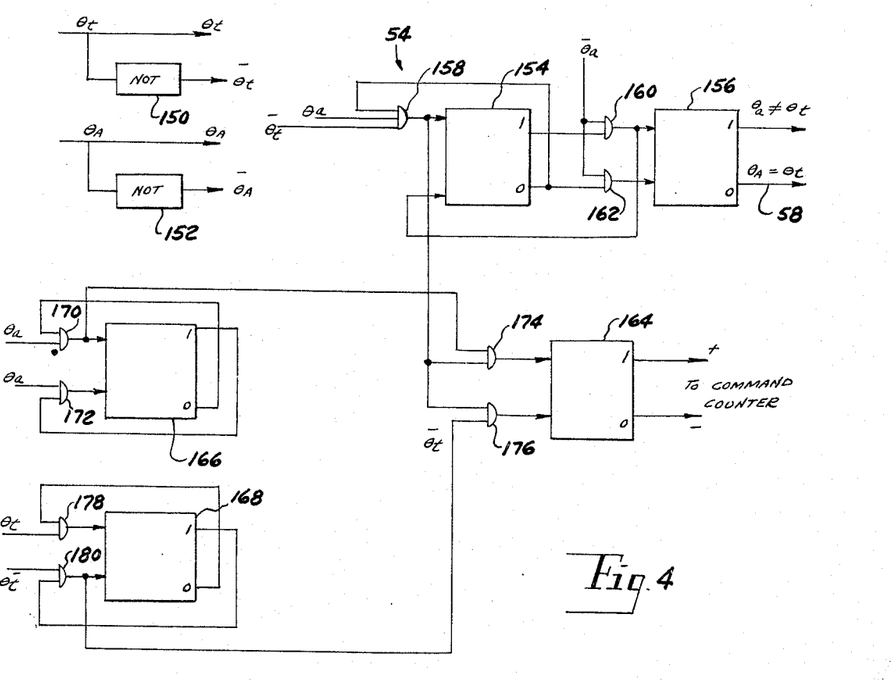
FIGURE 4 is a schematic block diagram of the identity test unit of the present invention.

The output of the level discriminator 140 representing $\theta_t$ as well as the signal from the command counter 56 which represents $\theta_a$ are both provided to the identity test unit 54, which is disclosed in detail in FIG. 4. The identity test unit must determine whether $\theta_a$ differs from $\theta_t$ and also provides an output indicative of the sign of the difference. The signals $\theta_a$ and $\theta_t$ are first presented to "Not" units 150 and 152, which are of conventional construction and provide outputs indicative of the reciprocals of their inputs. These signals are used at various points in the identity test unit.

A pair of clock conditioned flip-flops 154 and 156 act to determine the equality or inequality of $\theta_a$ and $\theta_t$. The flip-flop 154 has one input from an AND gate 158, which is conditioned by the signals $\theta_a$, $\theta_t^-$ and its own "0" or "low" output. The "1" or "high" output of the flip-flop 154 provides input to an AND gate 160 which also has $\theta_a^-$ as its other input. The other side of the flip-flop 156 receives its input from an AND gate 162 which has the 0 output of flip-flop 154 and $\theta_a^-$ as its inputs. If $\theta_a$ differs from $\theta_t$, the flip-flop 154 will be high at some point during the cycle and it will set the flip-flop 156 so as to provide an output on that flip-flop's high side which indicates that there is a difference between the phases of the two signals. A phase difference will be detected only if it is larger than the equivalent time between clock pulses. For example, if the frequency of the $\theta_a$ and $\theta_t$ signals were 200 c.p.s. and the clock frequency were 200 kc., the equivalent phase shift per clock pulse would be one one-thousandth of a cycle, or 0.36 degree. This would be the minimum recognizable phase difference. If any cycle occurs in which the flip-flop 154 is not set, the flip-flop 156 becomes re-set and its output goes low providing a signal on line 58 indicating an identity between the signals $\theta_a$ and $\theta_t$. In any cycle in which $\theta_a$ differs from $\theta_t$, another clock conditioned flip-flop 164 will test the condition of two more clock-set flips-flops 166 and 168 to determine whether $\theta_a$ is greater or less than $\theta_t$. The flip-flop 166 has inputs from a pair of and gates 170 and 172.

$\theta_a$ provides one input to the and gate 170 while $\theta_a^-$ provides one input to the and gate 172. The other inputs to the and gates are provided by the opposite outputs of the flip-flop 166. The and gate 170 also provides output to an and gate 174 which, along with an and gate 176, provides the two inputs to the flip-flop 164. The and gates 174 and 176 each have an input from the and gate 158 which provides an output when $\theta_a$ and $\theta_t^-$ occur simultaneously. The flip-flop 168 has inputs from and gates 178 and 180 which are respectively conditioned by $\theta_t$ and $\theta_t$ as well as the opposite outputs of the flip-flop 168. The and gate 180 provides the second input to the and gate 176.

The sign of the phase difference is determined by noting which of the flip-flops 166 or 168 is changing state at the same instant the output of gate 158 is going high. If flip-flop 166 is changing state from low to high, the output of gate 170 will be high, and thus the output of gate 174 will be high and flip-flop 164 will be set to the high state. This condition indicates that $\theta_a$ leads $\theta_t$. If, at the same time the output of gate 158 is going high, flip-flop 168 is going from high to low, the output of gate 180 will be high. This in turn will cause the output of gate 176 to go high, setting flip-flop 164 to the low state, which indicates that $\theta_a$ lags $\theta_t$.

Thus in any cycle in which $\theta_a$ and $\theta_t^-$ occur simultaneously, the flip-flop 164 will be high if the phase of $\theta_a$ leads the phase of $\theta_t$ and will be low if the phase of $\theta_t$ leads the phase of $\theta_a$. There signals are provided to the command counter 56 to control the direction of its phase shift as the result of pulses received from the voltage controlled oscillator 62.

The pulse generator 66 also provides a square wave output which has a phase shift intermediate of the two square waves which are provided to the modulators 130 and 132. This 45-degree shifted square wave is fed to a shaper-filter-amplifier 142 in the reference sine wave generator 64 where it is converted to a sine wave. A phase shifter 144 accepts the sine wave and provides two output sine waves, each shifted 45 degrees with respect to its input sine wave, which thus have the same phase shift as the square wave sent to the modulators 130 and 132. These waves are independently amplified by units 146 and 148 and fed to the demodulator units 60 and 62.

The demodulator unit thus has as its keying input a square wave shifted by the active cutting angle, and provides as an output a D.C. voltage proportional to the sine of the active cutting angle. This is fed to the filter 68 and then to the potentiometer 72. Similarly, the demodulator 152 provides a D.C. output voltage proportional to the cosine of the active cutting angle which its keying square wave provides. This is sent to a filter 70 and then to the potentiometer 74 where it is multiplied by the quantity R.

Figure 6:
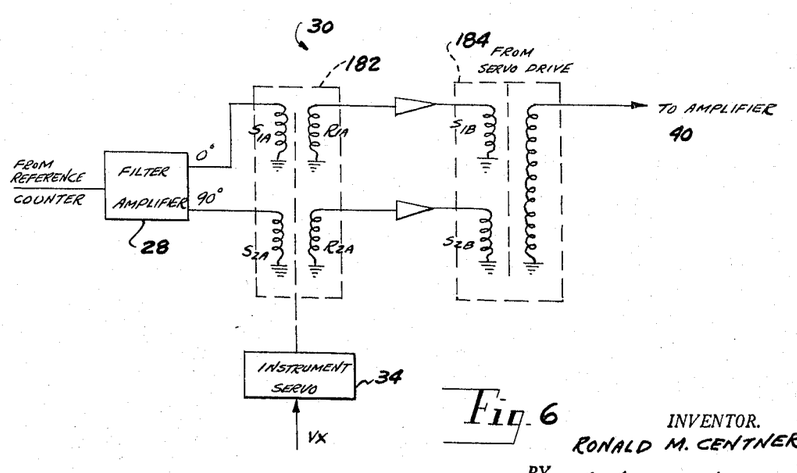
FIGURE 6 is a schematic block diagram of the unit which sums the offset signal with the command signal.

The manner in which the sum unit 30 combines the rotation of the instrument servo 34 and the drive servo 32 in order to provide a phase shifted output wave to the amplifier 40 is disclosed in FIG. 6. The sum unit employs a pair of resolvers 182 and 184 which each have double stator and rotor winding. The rotor of the resolver 182 is driven by the instrument servo while the rotor of the resolver 184 is driven by the drive servo. The two stators S1a and S2a of resolver 182 are powered by two signals 90 degrees out of phase with one another from the filter amplifier 28. Its two rotor windings R1a and R2a provide the inputs to the two stator windings S1b and S2b of the resolver 184. One rotor winding of the resolver 184 then provides output to the amplifier 40. The sum unit 30 therefore provides an output which has a phase shift proportional to the sum of the rotations of the instrument servos 34 and a drive servo 32. If the output from the potentiometer 72 is equal to zero then the resolver 182 does not affect the operation of the sum unit. Any value of $V_x$ other than zero will cause a displacement of the output of the sum unit 30 proportional to this displacement as well as the displacement of the resolver 184 due to the motion of the servo drive 32.

The signal $V_x$ might alternately be introduced into the servo drive 20 in the line between the demodulator 42 and the servo drive 32 so as to directly add or subtract from the voltage provided to the servo drive. However, because of the non-linearity of the resolvers, if any appreciable offset signal is to be used a method such as that described must be employed to provide the offset signal with the same non-linearity that the feedback resolver signal employs. In control units which use a linear feedback device such as a digital servo system employing a bi-directional counter, the signal $V_x$ may be summed directly with the output of the analog section of the servo.

The other portion of the circuitry are known to practioners of the art and need not be disclosed in detail. The command counters 24 and 56 may be of the type disclosed in U.S. Patent No. 3,011,110. The voltage controlled oscillator 62 may be of any variety which provides a square wave output frequency proportional to the ratio of two input voltages. Such a unit is described in U.S. patent application No. 176,583.

As has been noted, the circuitry disclosed to this point is only capable of handling a control system of the type described as it operates in the linear interpolation mode. During circular interpolation, the angle $\theta$ is constantly changing and therefore means must be provided to cause the phase of the square wave $\theta_a$ to vary during a cut rather than between successive cuts as well as between successive cuts. FIGURE 7 represents a block diagram of a system which may accommodate either circular or linear interpolation. In that figure those parts which duplicate FIGURE 1 are simply indicated by the numbers assigned in FIGURE 1 and only the differing sections of the circuitry are labeled.

The circuit acts in an identical manner to that of FIGURE 1 in setting the command counter 56 to a particular phase output from information contained in temporary storage. During active storage of a circular interpolation block, two signals $D_xFA$ and $D_yFA$ are provided to a serial decoding unit 200 from the delay line storage 16. These signals are proportional to the rectangular components of the rotating radius vector. The serial decoder 200 acts in the same manner as the converter 48 to provide two static output voltages $VD_xFA$ and $VD_yFA$ which have analog magnitudes proportional to the two radius vector components. These analog voltages are provided to a vector magnitude circuit 202 which provides an output voltage VDR proportional to the vector sum of its two input voltages. This circuit may be of any well known type and one circuit which is applicable is described in the 1958 I.R.E. Wescon Convention Record, Part 4, page 123, "Network Solution of the Right Triangle Problem," by M. R. Winkler.

This signal VDR provides one input to a voltage controlled oscillator 204 while VFR represents the other input. The oscillator 204 is of the same nature as the oscillator 62 and the two may be time shared if desired. It provides an output voltage which is a function of the ratio between VDR and VFR, and which is directly proportional to VFR and inversely proportional to VDR. This ratio represents the rate of change of $\theta_a$ during circular interpolation. It is provided to an and gate 206 which also has an input from the controller 18 indicating that the unit is in the circular interpolation mode. The output of the and gate 206 is summed in an or gate 208 with the output of the and gate 60 which carries the square wave output of the oscillator 62.

During a block of circular interpolation, the voltage controlled oscillator 204 feeds the command counter 56 through the gates 206 and 208 in order to continually rotate $\theta_a$. During the change between two cuts of differing initial slope, the change in the phase of the command counter 56 is controlled by the oscillator 62 in the same manner as the circuitry of FIGURE 1.

Having thus described my invention, I claim:

1. An electronic system for a machine tool operative to receive a record and to control the motion of a tool with respect to a workpiece, comprising:
   means for generating a series of first signals in accordance with information contained on the record, said series of first signals being capable of commanding the output device through a series of connecting line paths which define the outline of a desired cut on the workpiece;
   means for introducing offset information relating to a tool being used with the system;
   means for generating an analog offset signal from the offset information for each of said series of first signals; means for modifying said offset signals following the termination of each of the first signals in said series and prior to the initiation of the next of said first signals;
   means for combining said offset signals with said series of first signals in order to create a series of second signals; and servo means, connected to receive said second signals, and operative to move the output device through a path which represents the path of the cutter center necessary to form the desired cut on the workpiece; whereby the second signal occurring following the termination of one of the first signals and prior to the initiation of the next succeeding signal solely constitutes the offset signal being modified.

2. An electronic system operative to receive a record and to control the motion of an output device, comprising:
   means for generating a series of first signals in accordance with information contained on the record, said series of signals being capable of commanding the output device through a motion defining a first path;
   means for introducing offset information;
   means for generating an analog offset signal from the offset information for each of said series of signals;
   means for modifying said offset signals at a rate which is a function of information contained on the record following the termination of each of the first signals and prior to the initiation of the next of said first signals;
   means for combining said offset signals with said series of first signals in order to create a series of second signals; and servo means, connected to receive said second signals, and operative to move the output device through a second path; whereby the second signal occurring following the termination of one of the first signals and prior to the initiation of the succeeding of said first signals, solely constitutes an offset signal undergoing modification.

3. An electronic system operative to receive a record and to control the motion of an output device, comprising:
   means for generating a series of first signals in accordance with information contained on the record, said series of signals being capable of commanding the output device through a motion defining a first path;
   means for introducing offset information;
   means for generating an analog offset signal from the offset information for each of said series of signals;
   means for modifying said offset signals at a rate which is directly proportional to information contained on the record and inversely proportional to the magnitude of the offset information following the termination of each of the first signals and prior to the initiation of the next of said first signals;
   means for combining said offset signals with said series of first signals in order to create a series of second signals; and servo means, connected to receive said second signals, and operative to move the output device through a second path; whereby the second signal occurring following the termination of one of said first signals and prior to the initiation of the succeeding first signal, solely constitutes an offset signal undergoing modification.

4. An electronic system operative to receive a record and to control the motion of an output device, comprising:
   means for generating a series of first signals in accordance with information contained on the record, said series of signals being capable of commanding the output device through a motion defining a first path;
   means for introducing offset magnitude information;
   means, acted upon by said offset magnitude information, for generating a pair of analog offset signals representing the rectangular components of the offset magnitude with respect to the instantaneous slope of the first path from offset information for each of said series of signals;
   means for modifying said offset signals following the termination of each of the first signals in said series and prior to the initiation of the next series;
   means for combining said offset signals with said first signals in order to create a series of second signals; and servo means, connected to receive said second signals, and operative to move the output device through a second path; whereby the second signal occurring following the termination of a first signal and prior to the initiation of the succeeding signal in the series solely constitutes an offset signal undergoing modification.

5. An electronic system for controlling the motion of an output device in accordance with information contained on a record, comprising:
   means for generating a series of first signals in accordance with information contained on the record, which signals are capable of controlling the output device through a plurality of connected line paths;
   a source for an offset magnitude information representing a condition of the device being controlled;
   means for generating a pair of analog offset signals under control of the offset magnitude information which, during the generation of any of said first signals, represent the rectangular components of the offset magnitude with respect to the instantaneous slope of the motion commanded by that first signal;
   means for modifying the offset signals during the interval between successive first signals so as to cause said offset signals to translate from the components of the slope at the termination of one signal to the components of the slope at the beginning of a subsequent signal;
   means for combining the offset signals with the first signals to create a second signal; and servo means, connected to receive said second signal, and operative to move the output device through a desired path, said last signal constituting solely an offset signal undergoing modification following the termination of one of the first signals and prior to the initiation of the succeeding first signal.

6. An electronic system for controlling the motion of an output device in accordance with information contained on a record, comprising:
   means for generating a series of first signals in accordance with information contained on the record, which signals are capable of controlling the output device through a plurality of connected line paths;
   a source for an offset magnitude information representing a condition of the device being controlled;
   means for generating a pair of analog offset signals under control of the offset magnitude information which, during the generation of any of said first signals, represent the rectangular components of the offset magnitude with respect to the instantaneous slope of the motion commanded by that first signal;
   means for modifying the offset signals during the interval between successive first signals at a rate inversely proportional to the offset magnitude so as to cause said offset signals to translate from the components of the slope at the termination of one signal to the components of the slope at the beginning of a subsequent signal;
   means for combining the offset signals with the first signals to create a second signal; and servo means, connected to receive said second signal, and operative to move the output device through a desired path; whereby said last signal constitutes an offset signal undergoing modification during the interval between the occurrence of successive first signals.

7. An electronic system for controlling the motion of an output device, comprising:
   a record containing information relating to a desired motion of the output device and a rate of output device motion;
   means for generating a series of first signals in accordance with information contained on the record, which siganls are capable of controlling the output device through a plurality of connected line paths;
   a source for an offset magnitude information representing a condition of the device being controlled;
   means for generating a pair of analog offset signals under control of said magnitude information, which during the generation of any of said first signals, represent the rectangular components of the offset magnitude with respect to the instantaneous slope of the motion commanded by that first signal;
   means for modifying the offset signals during the interval between successive first signals at a rate proportional to the motion rate information contained on the record and inversely proportional to the offset magnitude, so as to cause said offset signals to translate from the components of the slope at the termination of one signal to the components of the slope at the beginning of a subsequent signal;
   means for combining the offset signals with the first signals to create a second signal; and servo means connected to receive said second signal, and operative to move the output device through a desired path; whereby said last signal constitutes an offset signal undergoing modification during the interval between the occurrence of successive first signals.

8. An electronic system for controlling the motion of an output device, comprising: a record containing information relating to a desired motion of the output device and a rate of output device motion; means for generating a series of time separated reference and command signals in accordance with information contained on the record, said signals being capable of controlling the output device through a plurality of connected line paths; a servo system operative to receive said reference and command signals, said servo system including a first resolver connected to receive said reference signal and a second resolver mechanically connected to said output device, the electrical output of said first resolver being connected to the input of said second resolver; a source of offset magnitude information representing a condition of the device being controlled; means for generating a pair of offset signals which, during the generation of said reference and command signals, represent the rectangular components of the offset magnitude with respect to the instantaneous slope of the motion commanded by the reference and command signals; means for modifying the offset signals during the interval between successive reference and command signals at a rate proportional to the motion rate of information contained on the record and inversely proportional to the offset magnitude, so as to cause said offset signals to translate from the components of the slope at the termination of one set of reference and command signals to the components of the slope at the beginning of a subsequent set of reference and command signals, and an instrument servo controlled by one of said offset signals and operative to move said first resolver so as to provide a signal to the second resolver which is a function of the offset signal component and the reference signal.

References Cited by the Examiner

UNITED STATES PATENTS

| | | | |
|---|---|---|---|
| 2,883,110 | 4/1959 | Spencer et al. | 235—151.11 |
| 2,933,244 | 4/1960 | Tripp | 318—20.120 |
| 2,961,161 | 11/1960 | Spencer | 235—151 |
| 3,026,040 | 3/1962 | Spencer | 235—151 |
| 3,051,389 | 8/1962 | Fayard | 235—151 |
| 3,073,998 | 1/1963 | Bower | 318—20.120 |
| 3,123,657 | 3/1964 | Clark et al. | 235—151.11 |
| 3,176,120 | 3/1965 | Whitemore et al. | 235—151.11 |

OTHER REFERENCES

Brewer: "The Numerical Control of Machine Tools," supplement to The Engineer's Digest, September 1959 (80 pages, 39–45 relied on).

MALCOLM A. MORRISON, *Primary Examiner.*

K. W. DOBYNS, *Assistant Examiner.*